(12) United States Patent
Wheeler

(10) Patent No.: US 7,657,695 B1
(45) Date of Patent: Feb. 2, 2010

(54) EFFICIENT PROCESSING OF MEMORY ACCESSES TO VIRTUAL HARDWARE USING RUNTIME CODE PATCHING

(75) Inventor: Ross Wheeler, Paradise Valley, AZ (US)

(73) Assignee: Paravirtual Corporation, Janta Clara, CA (US)

( * ) Notice: Subject to any disclaimer, the term of this patent is extended or adjusted under 35 U.S.C. 154(b) by 453 days.

(21) Appl. No.: 11/755,695

(22) Filed: May 30, 2007

(51) Int. Cl.
G06F 12/06 (2006.01)
G06F 11/07 (2006.01)

(52) U.S. Cl. .......................... 711/6; 711/159; 711/203; 714/47; 714/53

(58) Field of Classification Search .................. None
See application file for complete search history.

(56) References Cited

U.S. PATENT DOCUMENTS 5,624,316 A * 4/1997 Roskowski et al. ........... 463/45
2004/0098639 A1 * 5/2004 Liu ............................. 714/35
2004/0162930 A1 * 8/2004 Forin et al. .................... 711/1
2008/0140971 A1 * 6/2008 Dankel et al. ............... 711/163

* cited by examiner

Primary Examiner—Than Nguyen
(74) Attorney, Agent, or Firm—Fernandez & Associates, LLP

(57) ABSTRACT

Systems and methods for efficient processing of virtual hardware memory accesses to using runtime code patching. Virtual hardware memory accesses are processed by handling a program's OS-trapped memory exception and performing runtime patching on the program's code to bypass the OS-trapped memory exception mechanism. Program runtime patching comprises modifying function addresses in a program's function address table to redirect function calls to virtualization functions for processing virtual hardware memory accesses without triggering OS-trapped memory exceptions.

15 Claims, 5 Drawing Sheets

EFFICIENT PROCESSING OF MEMORY ACCESSES TO VIRTUAL HARDWARE USING RUNTIME CODE PATCHING

BACKGROUND

1. Field

This invention relates to hardware virtualization, and in particular to efficient handling of virtual hardware memory accesses.

2. Related Art

Software programs wishing to communicate with a piece of hardware generally do so via a device driver. A device driver is a piece of software that acts as an interface between a piece of hardware and programs wishing to communicate with the hardware. One way a device driver communicates with the hardware is by writing to and reading from memory locations mapped from the virtual memory of the computer running the software to memory locations of the hardware.

In a hardware virtualization environment, one or more pieces of physical hardware are virtualized by software acting as "virtual hardware". The virtual hardware simulates the results of memory accesses to addresses associated with the piece of hardware via a virtual memory mapping. The present invention discloses systems and methods for efficient processing of virtual hardware memory accesses to using runtime code patching.

SUMMARY

Systems and methods are disclosed for efficient processing of virtual hardware memory accesses to using runtime code patching. In one embodiment, a method for processing virtual hardware memory accesses comprises handling a program's OS-trapped memory exception and performing runtime patching on the program's code to bypass the OS-trapped memory exception mechanism. In another embodiment, a method for processing a program comprises replacing a first address of a first function in a program's function address table with a second address of a second function, the second function comprising code for processing virtual hardware memory accesses without triggering an OS-trapped memory exception. Other embodiments are disclosed as well.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Hardware prototypes typically pose numerous challenges to software engineers, such as lack of availability, pre-production quality and difficulty of sharing development environments with teams that are geographically scattered. Therefore, a hardware virtualization environment is especially useful and convenient if it allows software engineers to write, test and debug device drivers (or other programs communicating with physical hardware) independently of whether the piece of hardware is physical or virtual. This way, software can be developed with virtual hardware with the expectation that the software will work unmodified when the virtual hardware is replaced with corresponding physical hardware.

However, traditionally in a hardware virtualization environment a piece of software's virtual hardware memory accesses are handled by an exception handler that is designed to be called by the operating system (OS) whenever the software attempts to access a memory location in virtual memory that is mapped to a hardware memory location. The exception handler then simulates the response of physical hardware to the memory access and may call other functions that implement parts of the simulation. While this method works accurately, repeated invocation of the OS-provided memory exception mechanism is a source of inefficiency for the virtualization. The present embodiments disclose techniques in a hardware virtualization environment that allow software to be developed independently of whether the piece of hardware is physical or virtual, while at the same time handling virtual hardware memory accesses more efficiently by obviating repeated invocation of the OS-provided memory exception mechanism.

Figures 1, 1A, 1B:
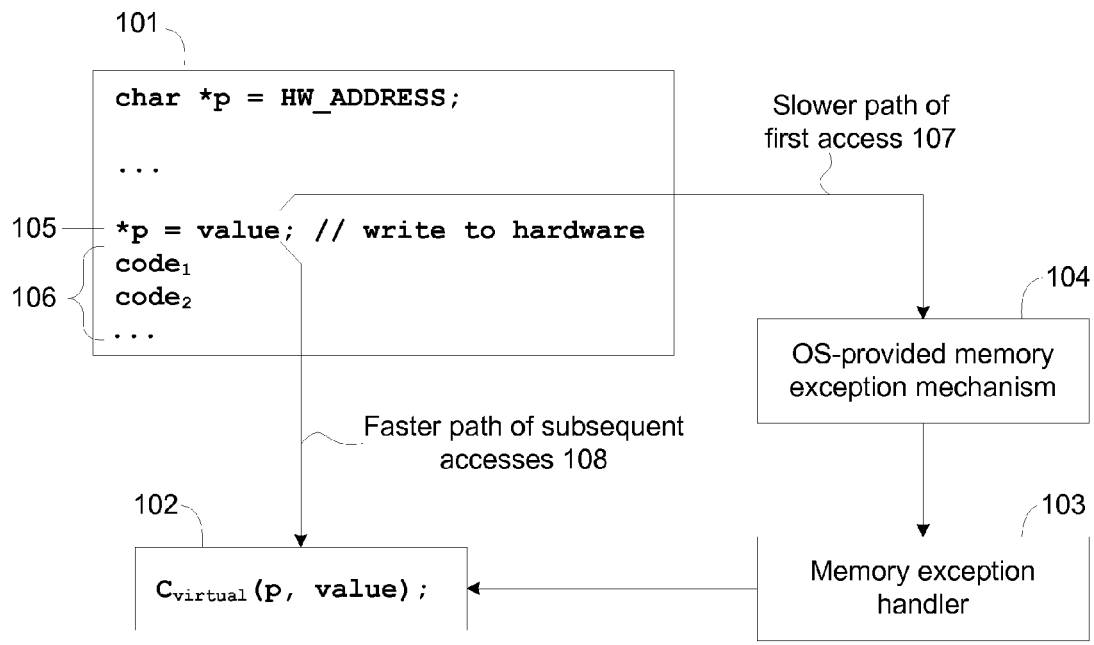
FIG. 1 is a block diagram illustrating a hardware virtualization environment, in accordance with an embodiment of the present invention.
FIG. 1a illustrates runtime patched code of a virtual hardware memory access, comprising a jump to a piece of virtualization code, in accordance with an embodiment of the present invention.
FIG. 1b illustrates the design of a piece of virtualization code implementing behavior of virtual hardware in response to a virtual hardware memory access, in accordance with an embodiment of the present invention.

FIG. 1 is a block diagram illustrating a hardware virtualization environment. Program 101 is a piece of software written to communicate with a piece of physical hardware, with the communication intended to proceed via one or more memory accesses mapped from the program's 101 virtual memory to addresses associated with the physical hardware. In this virtualization environment, physical hardware is simulated by software code $C_{Virtual}$ 102 for processing the virtual hardware memory access and thereby providing the functionality of the hardware expected by the program 101. To provide a path from the virtual hardware memory access to $C_{Virtual}$ 102, a memory exception handler 103 is registered with the OS-provided memory exception mechanism 104 and calls $C_{Virtual}$ 102 when handling virtual hardware memory accesses of program 101 at runtime. This handler 103 preferably runs in user-space (though it may also run in kernel-space) and is described in further detail below.

Figure 2:
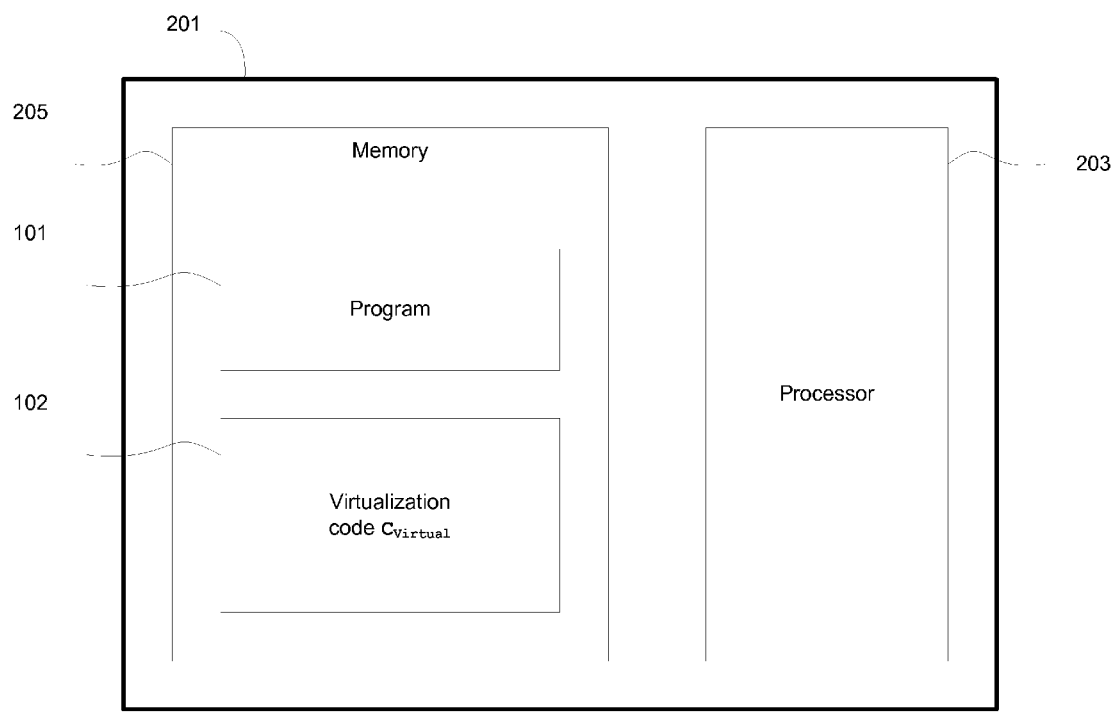
FIG. 2 is a block diagram of a hardware virtualization system, in accordance with an embodiment of the present invention.

FIG. 2 is a block diagram of a hardware virtualization system. The system comprises a computer 201 having a processor 203 and a memory element 205 for storing program 101 and virtualization code $C_{Virtual}$ 102. Processor 203 executes the instructions of program 101 and virtualization code $C_{Virtual}$ 102.

As an illustrative example using the "C" computer language, a virtual hardware memory access in program 101 is shown using a character pointer char *p declared and initialized to point to a hardware memory address HW_ADDRESS. This pointer is used later in program 101 to assign a value to the hardware memory location using the exemplary statement 105 *p=value. The program 101 then proceeds with other exemplary code 106 $code_1 \ldots code_n$.

Since the memory address HW_ADDRESS is a physical hardware address and program 101 is running in a hardware virtualization environment, runtime access to this address is trapped by the OS provided memory exception mechanism 104 as a memory exception. Therefore, at runtime when program 101 executes statement 105 for the first time, a memory exception is raised and the OS hands over control to the memory exception handler 103.

At this point, handler 103 does two things. It calls $C_{Virtual}$ 102 to process the program's 101 virtual hardware memory access. In addition, handler 103 also performs runtime patching of program's 101 in-memory code, replacing the virtual hardware memory access (which in FIG. 1 is represented by the exemplary statement 105 *p=value) with a jump to $C_{Virtual}$ 102. The effect of this runtime patching is that subsequent virtual hardware memory accesses of program 101 at statement 105 no longer take the slow path 107 via the OS-provided memory exception route, but instead take the faster path 108 going straight to the $C_{Virtual}$ 102 and avoiding the memory exception route. For a program that repeatedly executes the in-memory code corresponding to the virtual hardware memory access 105, path 108 can be substantially faster than path 107. Experiments with widely used operating systems such as Microsoft Windows™ and Linux™ based systems have shown path 108 to be hundreds of times faster than path 107.

FIG. 1a illustrates the runtime patched code 109 of the virtual hardware memory access 105, comprising a jump to $C_{Virtual}$ 102 (with arguments passed as needed). Note that the code for jumping to $C_{Virtual}$ 102 may require more space than occupied by the code for the virtual hardware memory access 105. When that is the case, the code for jumping to $C_{Virtual}$ 102 overwrites some code originally following the virtual hardware memory access 105. In FIG. 1, this overwritten code is represented as $code_1$. Hence, in the runtime patched code 109, the code for jumping to $C_{Virtual}$ 102 is followed by $code_2$, and $code_1$ is inserted into $C_{Virtual}$ 102, as will now be described.

FIG. 1b illustrates the design of code $C_{Virtual}$ 102. $C_{Virtual}$ 102 comprises virtualization code 110, which implements the behavior of the virtual hardware in response to the virtual hardware memory access which resulted in the call to $C_{Virtual}$ 102 (including the arguments passed to $C_{Virtual}$ 102). In a case where $code_1$ is overwritten by code for jumping to $C_{Virtual}$ 102, $C_{Virtual}$ 102 also comprises $code_1$ for execution after the virtualization code 110. Finally, $C_{Virtual}$ 102 returns control by jumping back to $code_2$ in the caller program 101. Note than in a case where $code_1$ is not overwritten, there is no need for $C_{Virtual}$ 102 to comprise $code_1$ and control is returned by jumping back to $code_1$ in the caller program 101.

Figure 3A:
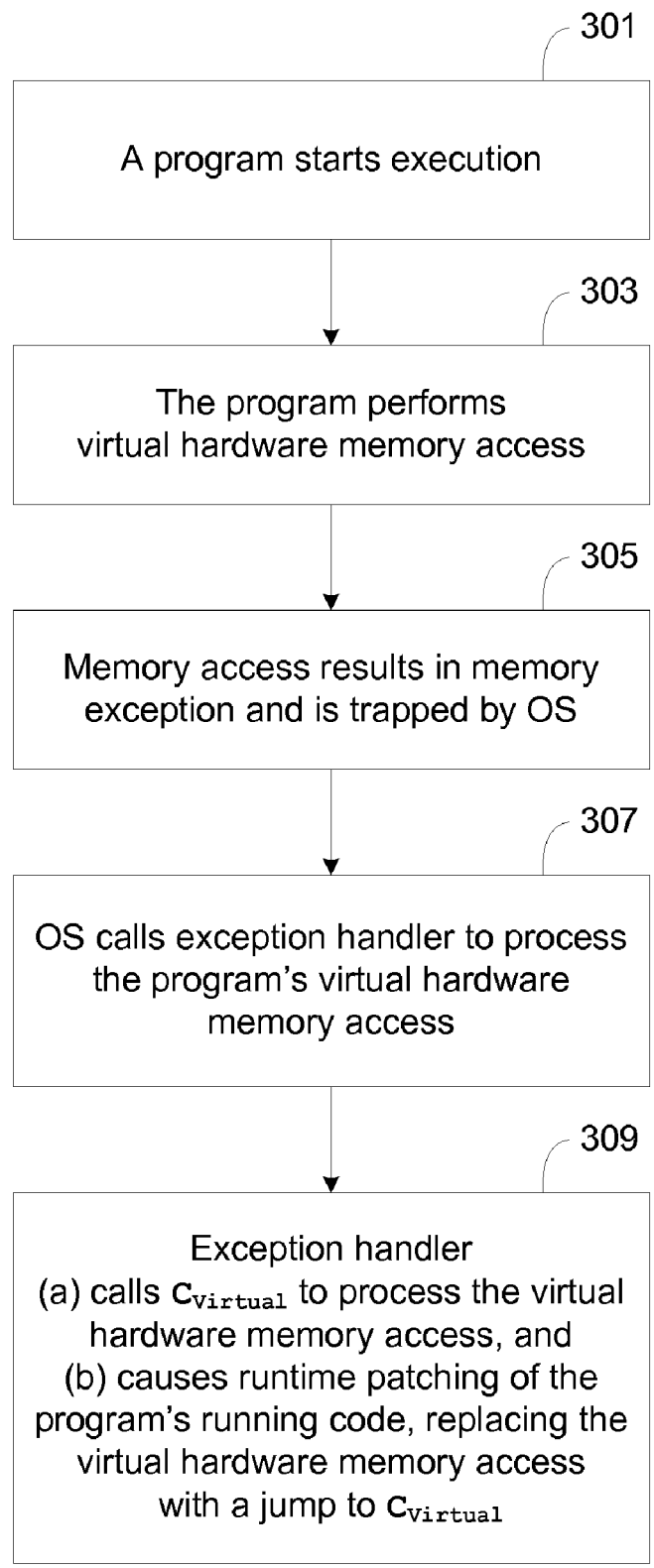
FIG. 3a is a flow chart illustrating a method for processing virtual hardware memory accesses in a hardware virtualization environment, in accordance with an embodiment of the present invention.

FIG. 3a is a flow chart illustrating a method for processing virtual hardware memory accesses in a hardware virtualization environment. At step 301, a program 101 starts execution. At step 303, the program 101 performs a virtual hardware memory access. At step 305, the virtual hardware memory access results in a memory exception and is trapped by the OS. At step 307, the OS calls the exception handler registered to handle the program's 101 virtual hardware memory access. At step 309, the exception handler (a) calls $C_{Virtual}$ 102 to process the virtual hardware memory access, and (b) causes runtime patching of the program's 101 running code, replacing the virtual hardware memory access with a jump to $C_{Virtual}$ 102, thereby causing future executions of the virtual hardware memory access to take the faster path 108 and avoid the slower memory exception path 107.

Notice that since $C_{Virtual}$ 102 may comprise code specific to the particular virtual hardware memory access 105 and immediately following code $code_1$, different instances of $C_{Virtual}$ 102 may be customized for the particular callers they serve.

Another technique for performing runtime code patching in a virtual hardware environment deals with functions involving memory access (such as memset, memcpy, memcmp, etc. in the "C" standard library). Taking memcpy as an illustrative example, in the program's 101 function address table (such as in the "import address table" (IAT) in Windows™) we replace the memory address associated with memcpy with a memory address that is associated with a related function $memcpy_{Virtual}$. Calls to memcpy now end up executing $memcpy_{Virtual}$ instead. When invoked, $memcpy_{Virtual}$ checks whether the caller's memory access is a virtual hardware memory access. If yes, $memcpy_{Virtual}$ processes the virtual hardware memory access. Otherwise, $memcpy_{Virtual}$ calls the original (non-virtualized) memcpy to handle the memory access. This is similar to replacing calls to memcpy within program 101 with an instruction to jump to $memcpy_{Virtual}$, which is an alternative way of achieving the results of runtime function patching.

Figure 3B:
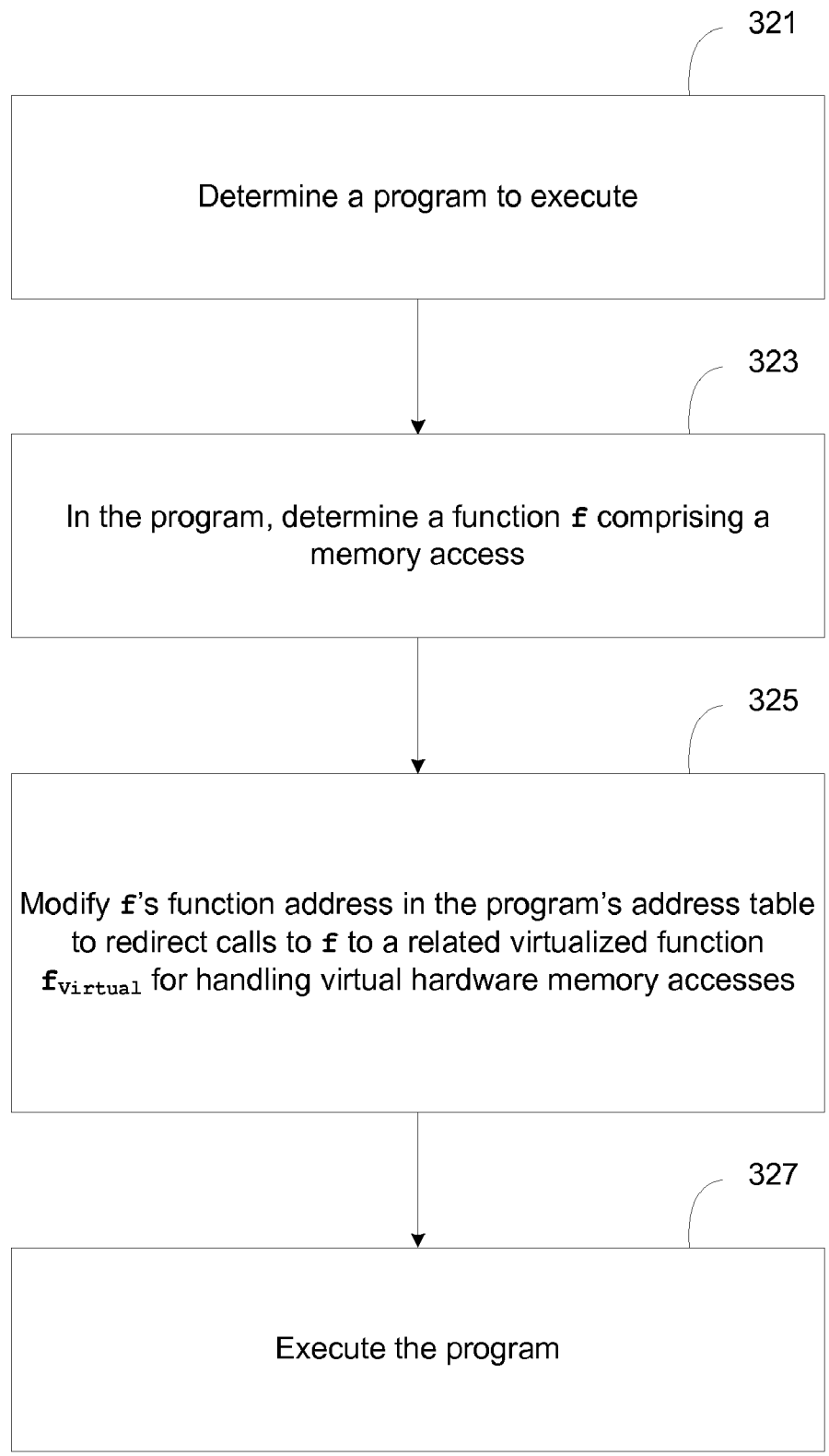
FIG. 3b is a flow chart illustrating a method for runtime function patching, in accordance with an embodiment of the present invention.

FIG. 3b is a flow chart illustrating a method for runtime function patching. Step 321 determines a program 101 that is to be executed. Step 323 determines a function f comprising a memory access. Step 325 modifies f's function address in the program's 101 function address table to redirect calls to f to a related function $f_{Virtual}$ for handling virtual hardware memory accesses. When invoked, $f_{Virtual}$ checks whether the caller's memory access is a virtual hardware memory access. If yes, $f_{Virtual}$ processes the virtual hardware memory access, otherwise $f_{Virtual}$ calls f to handle the memory access. At step 327, the program 101 is executed with the modified function address table in place.

Figure 4A:
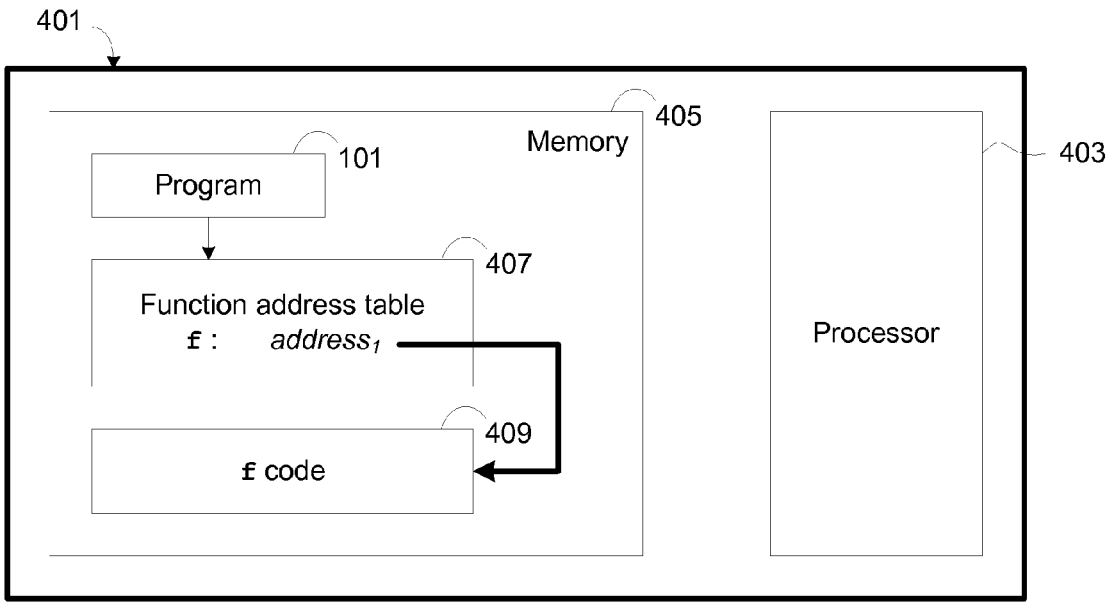
FIGS. 4a and 4b are block diagrams illustrating a hardware virtualization system, comprising a computer and a memory element, in accordance with an embodiment of the present invention.
Figure 4B:
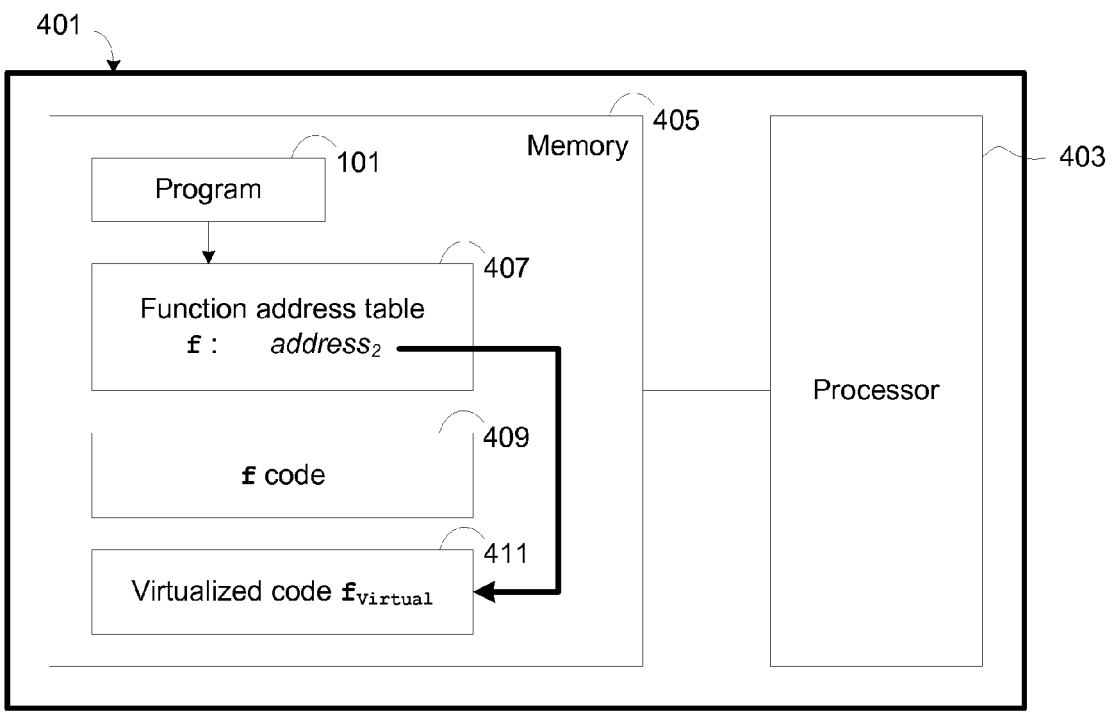

FIG. 4a is a block diagram of a hardware virtualization system comprising a computer 401 having a processor 403 and a memory element 405 for storing program 101, function address table 407 and code for function f 409. The function address table 407 indicates that the address $address_1$ for function f 409 points to the code for function f 409. FIG. 4b is a block diagram of the hardware virtualization system after modification of the function address table 407, as described above in FIG. 3b. The address of the function f 409 in the function address table 407 is now modified to $address_2$ pointing to the code for $f_{Virtual}$.

A code sample for illustrating examples of the presented techniques for processing virtual hardware memory accesses is provided in Appendix A. The code is written in the "C" programming language, uses assembler, and is written for a Windows™ operating system environment. It will be apparent to those skilled in the art, from the techniques disclosed herein and the code sample, how to implement the techniques in other operating systems. Appendix B provides an output resulting from executing the code sample of Appendix A.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

APPENDIX A

Example code for processing virtual hardware memory accesses

```
#define _WIN32_WINNT 0x501
#include <stdlib.h>
#include <windows.h>
#include <time.h>
#include <stdio.h>
#include <ctype.h>
//////////////////////////////////////////////////////////
static void function_call_with_3_paramters
   (unsigned int *p_a, unsigned int *p_b, unsigned int *p_c);
LONG WINAPI illegal_memory_access_handler
   (struct _EXCEPTION_POINTERS *ExceptionInfo);
void measure_performance (void);
void exception_test (void);
void function_test_no_exceptions (void);
void memcpy_test_with_exceptions (void);
void call_to_exception_routine (void);
void exception_routine (void);
void *vm_optimized_memcpy
      (void *destination,void *source,size_t length);
void *(*fp_vm_optimized_memcpy)
      (void *destination,void *source,size_t length);
#define NUMBER_OF_ITERATIONS 1000000
unsigned char enable_patch_flag;
//////////////////////////////////////////////////////////
void main (void)
{
  PVOID h1;
  HMODULE module_handle;
  module_handle = LoadLibrary (L"msvcr80d.dll");
  fp_vm_optimized_memcpy =
     (void *(*) (void *destination, void *source, size_t length))
        GetProcAddress (module_handle,"memcpy");
  h1 =AddVectoredExceptionHandler(1,
  illegal_memory_access_handler);
  measure_performance( );
  RemoveVectoredExceptionHandler(h1);
}
//////////////////////////////////////////////////////////
void measure_performance(void)
{
  void *p_memcpy;
  enable_patch_flag = 0;
  printf("Exception Test without patch\n");
  exception_test ( );
  enable_patch_flag = 1;
  printf("Exception Test with patch\n");
  exception_test ( );
  enable_patch_flag = 0;
  printf("Function Test no exceptions\n");
  function_test_no_exceptions ( );
  printf("Memory Test with exceptions\n");
  memcpy_test_with_exceptions ( );
  printf("Memory Test without exceptions\n"); // remap memcpy ->
  // vm_optimized_memcpy
  p_memcpy = (void *) &memcpy; //00411113 E9 30 0F 00 00 jmp
```

APPENDIX A-continued

Example code for processing virtual hardware memory accesses

```
             00412048
  *((unsigned int *) ((unsigned char *)p_memcpy + 1)) =
     (unsigned int) ((unsigned char *) vm_optimized_memcpy -
             (unsigned char *) p_memcpy - 5);
  memcpy_test_with_exceptions ( );
}
//////////////////////////////////////////////////////////
LONG WINAPI illegal_memory_access_handler
   (struct _EXCEPTION_POINTERS *ExceptionInfo)
{
  PCONTEXT Context;
  unsigned char *p_code_bytes;
  unsigned long oldprotect;
  unsigned long size_of_instruction_block;
  unsigned char original_instructions_to_execute[256];
  Context = ExceptionInfo->ContextRecord;
  if (ExceptionInfo->ExceptionRecord->ExceptionCode == 0xc0000005)
  {
    if (enable_patch_flag == 1)
    {
      // C6 05 00 00 00 00 00 mov         byte ptr ds:[0],0
      p_code_bytes = (unsigned char *) Context->Eip;
      // cheat - we know the size - this way we don't have to call
      // the disassembler to figure this out
      size_of_instruction_block = 7;
      // store address exception code (mov byte ptr ds:[0],0) for
      // execution later
      memcpy (&original_instructions_to_execute[0],
              p_code_bytes,
              size_of_instruction_block);
      // turn off write protection on the code segment
      VirtualProtect((void *) Context->Eip,
              size_of_instruction_block,
              PAGE_EXECUTE_READWRITE,
              &oldprotect);
      // call xxxx
      *(p_code_bytes + 0) = 0xe8;
      // call exception_routine is placed into access code
      *((unsigned int *) (p_code_bytes + 1)) =
         (unsigned int) ((unsigned char *) exception_routine -
                 Context->Eip - 5);
      // NOP - fill in last few bytes
      *(p_code_bytes + 5) = 0x90;
      *(p_code_bytes + 6) = 0x90;
      // move instruction pointer past code that causes exception
      Context->Eip += size_of_instruction_block;
    } else {
      // skip over C6 05 00 00 00 00 00 mov       byte ptr ds:[0],0
      Context->Eip += 7;
    }
    return EXCEPTION_CONTINUE_EXECUTION;
  } else {
  return EXCEPTION_CONTINUE_SEARCH;
  }
}
//////////////////////////////////////////////////////////
_declspec (naked) void exception_routine (void)
{
  static unsigned int count = 0;
  _asm pushad // save all of the registers
  _asm pushf
  ++count; // count to simulate storing value
  _asm popf
  _asm popad
  _asm ret
}
//////////////////////////////////////////////////////////
void exception_test (void)
{
  time_t     start, finish;
  double     elapsed_time;
  DWORD start_tick_count;
  DWORD end_tick_count;
  char *p = 0;
  unsigned int iterations;
  unsigned dummy;
  unsigned int *p_a = &dummy;
```

APPENDIX A-continued

Example code for processing virtual hardware memory accesses

```
unsigned int *p_b = &dummy;
unsigned int *p_c = &dummy;
time( &start );
start_tick_count = GetTickCount ( );
for (iterations = 0; iterations < NUMBER_OF_ITERATIONS;
++iterations)
{
  // this is the code that will be patched
  *((unsigned char *) 0x00000000) = 0x0;
  // *p = 1;
}
end_tick_count = GetTickCount ( );
time( &finish );
elapsed_time = difftime( finish, start );
printf("%s:Program takes %6.0f seconds, Milliseconds %0d .\n",
    __FUNCTION__, elapsed_time,(end_tick_count -
    start_tick_count ));
}
//////////////////////////////////////////////////////////////
void function_test_no_exceptions (void)
{
  time_t    start, finish;
  double    elapsed_time;
  DWORD start_tick_count;
  DWORD end_tick_count;
  char *p = 0;
  unsigned int iterations;
  unsigned dummy;
  unsigned int *p_a = &dummy;
  unsigned int *p_b = &dummy;
  unsigned int *p_c = &dummy;
  time( &start );
  start_tick_count = GetTickCount ( );
  for (iterations = 0; iterations < NUMBER_OF_ITERATIONS;
  ++iterations)
  {
    function_call_with_3_paramters (p_a, p_b, p_c);
  }
  end_tick_count = GetTickCount ( );
  time( &finish );
  elapsed_time = difftime( finish, start );
  printf("%s:Program takes %6.0f seconds, Milliseconds %0d .\n",
      __FUNCTION__, elapsed_time,(end_tick_count -
      start_tick_count ));
}
//////////////////////////////////////////////////////////////
static void function_call_with_3_paramters (unsigned int *p_a,
unsigned
int *p_b, unsigned int *p_c)
{
  *p_a = 1;
  *p_b = 1;
  *p_c = 1;
}
//////////////////////////////////////////////////////////////
void memcpy_test_with_exceptions (void)
{
  time_t    start, finish;
  double    elapsed_time;
  DWORD start_tick_count;
  DWORD end_tick_count;
  char *p = 0;
  unsigned int iterations;
  unsigned dummy;
  unsigned int *p_a = &dummy;
  unsigned int *p_b = &dummy;
  unsigned int *p_c = &dummy;
  time( &start );
  start_tick_count = GetTickCount ( );
  for (iterations = 0; iterations < NUMBER_OF_ITERATIONS;
  ++iterations)
  {
    memcpy (0,p,1); // *p = 1 ... using memcpy
  }
  end_tick_count = GetTickCount ( );
  time( &finish );
  elapsed_time = difftime( finish, start );
```

APPENDIX A-continued

Example code for processing virtual hardware memory accesses

```
  printf("%s:Program takes %6.0f seconds, Milliseconds %0d .\n",
      __FUNCTION__, elapsed_time,(end_tick_count -
      start_tick_count ));
}
//////////////////////////////////////////////////////////////
void *vm_optimized_memcpy
  (void *destination,void *source,size_t length)
{
  // change destination to new location (use temp variable)
  unsigned int destination_value;
  // change source to new location (use temp variable)
  unsigned int source_value = 1;
  return ((*fp_vm_optimized_memcpy)
          (&destination_value, &source_value,length));
}
```

APPENDIX B

Output from the code in Appendix A

Exception Test without patch
exception_test:Program takes    15 seconds,   Milliseconds 14657 .
Exception Test with patch
exception_test:Program takes    0 seconds,   Milliseconds 31 .
Function Test no exceptions
function_test_no_exceptions:Program takes    0 seconds,   Milliseconds 109.
Memory Test with exceptions
memcpy_test_with_exceptions:Program takes    15 seconds, Milliseconds 14375 .
Memory Test without exceptions
memcpy_test_with_exceptions:Program takes    0 seconds, Milliseconds 157.

The invention claimed is:

1. A method for processing virtual hardware memory accesses, comprising:
    handling an OS-trapped memory exception triggered by a virtual hardware memory access of an executing program; and
    performing runtime patching of the program's code, the runtime patching comprising replacing the program's code for the virtual hardware memory access with a jump to a virtualization code block, the virtualization code block to process virtual hardware memory accesses without triggering an OS-trapped memory exception;
    thereby allowing efficient processing of subsequent virtual hardware memory accesses of the executing program by bypassing OS-trapped memory exceptions.

2. The method of claim 1, wherein the virtual hardware memory access is triggered by a memory access to a memory location indicating a physical hardware address.

3. The method of claim 2, wherein the handling uses a memory exception handler registered with an OS-provided memory exception mechanism.

4. The method of claim 3, wherein in addition to replacing the program's code for the virtual hardware memory access, the runtime patching overwrites a further piece of the program's code, and wherein the virtualization code block includes at its end the overwritten piece of code, thereby allowing execution of the overwritten piece of code prior to returning from the virtualization code block.

5. The method of claim 3, wherein the jump to the virtualization code block further comprises passing one or more arguments to the virtualization code block.

6. The method of claim 3, wherein the handler runs in user-space.

7. A method for processing a program that makes virtual hardware memory accesses, comprising:

determining a first function in the program, the first function comprising a virtual hardware memory access; and replacing a first address of the first function in the program's function address table with a second address of a second function, the second function comprising code for processing the virtual hardware memory access of the first function without triggering an OS-trapped memory exception;

thereby allowing efficient processing of virtual hardware memory accesses of the first function by bypassing OS-trapped memory exceptions.

8. The method of claim 7, further comprising executing the program after the replacing step.

9. A system for allowing programs to communicate with virtual hardware, comprising:

a memory element to store (a) a program and (b) a virtualization code block to process virtual hardware memory accesses without triggering an OS-trapped memory exception; and a processor to:

execute the program;

handle an OS-trapped memory exception triggered by a virtual hardware memory access of the executing program; and perform runtime patching of the program's code, the runtime patching comprising replacing the virtual hardware memory access with a jump to the virtualization code block;

thereby allowing efficient processing of subsequent virtual hardware memory accesses of the executing program by bypassing OS-trapped memory exceptions.

10. The system of claim 9, wherein the virtual hardware memory access is triggered by a memory access to a memory location indicating a physical hardware address.

11. The system of claim 10, wherein the handling uses a memory exception handler registered with an OS-provided memory exception mechanism.

12. The system of claim 11, wherein in addition to replacing the program's code for the virtual hardware memory access, the runtime patching overwrites a further piece of the program's code, and wherein the virtualization code block includes at its end the overwritten piece of code, thereby allowing execution of the overwritten piece of code prior to returning from the virtualization code block.

13. The system of claim 11, wherein the jump to the virtualization code block further comprises passing one or more arguments to the virtualization code block.

14. The system of claim 11, wherein the handler runs in user-space.

15. A system for allowing programs to communicate with virtual hardware, comprising:

a memory element to store (a) a program having a first function comprising a virtual hardware memory access, and (b) a virtualization code block comprising a second function to process the virtual hardware memory access of the first function without triggering an OS-trapped memory exception; and a processor to:

replace a first address of the first function in the program's function address table with a second address of the second function; and execute the program;

thereby allowing efficient processing of virtual hardware memory accesses of the first function by bypassing OS-trapped memory exceptions.

* * * * *